H. L. JONES & R. ANDERSON.
BEAMLESS BRAKE.
APPLICATION FILED FEB. 15, 1913.
1,098,806.
Patented June 2, 1914.
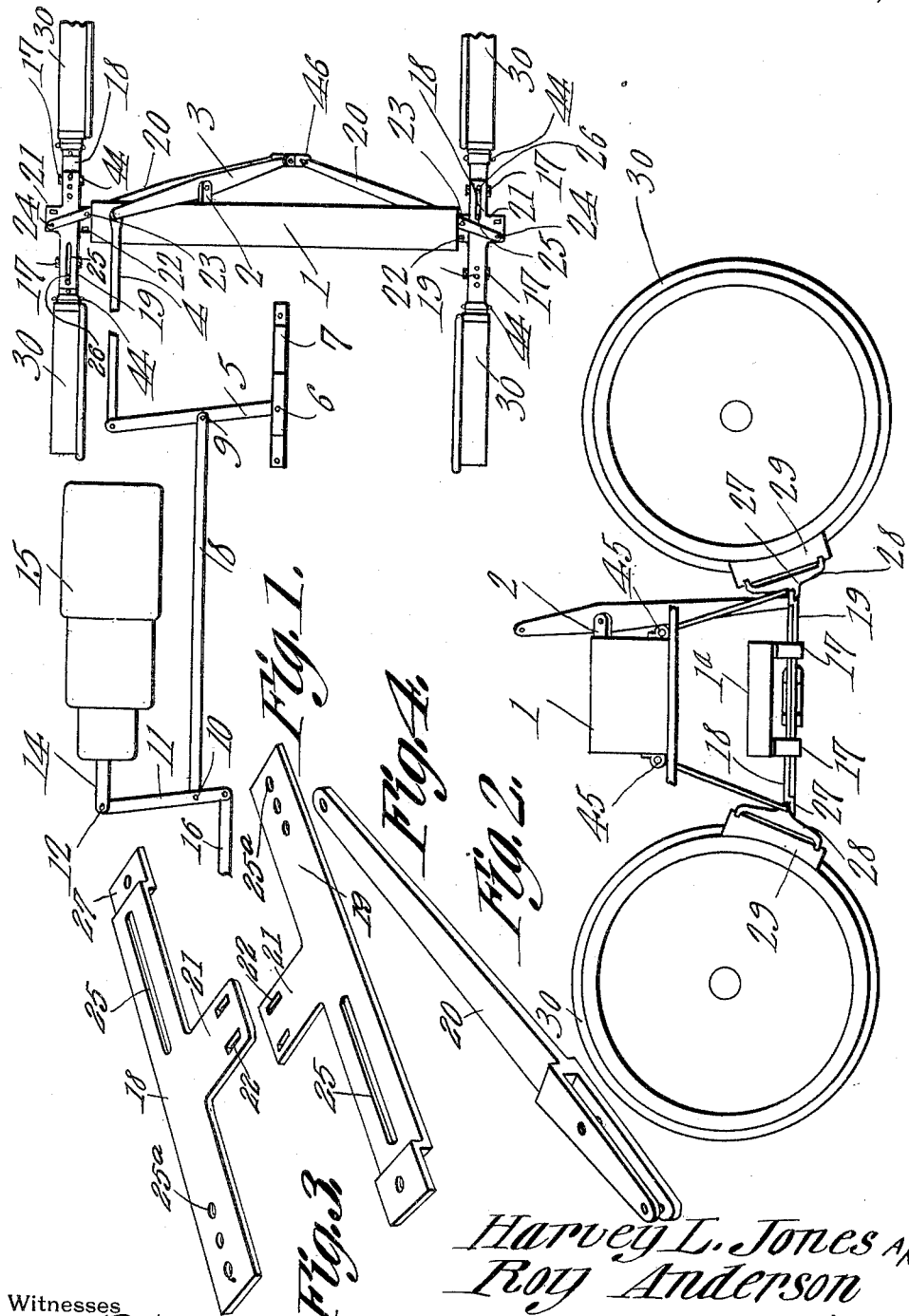
Harvey L. Jones and
Roy Anderson
Inventors

UNITED STATES PATENT OFFICE.

HARVEY L. JONES AND ROY ANDERSON, OF CHARLESTON, ILLINOIS.

BEAMLESS BRAKE.

1,098,806. Specification of Letters Patent. Patented June 2, 1914.

Application filed February 15, 1913. Serial No. 748,683.

*To all whom it may concern:*

Be it known that we, HARVEY L. JONES and ROY ANDERSON, citizens of the United States, residing at Charleston, in the county of Coles, State of Illinois, have invented a new and useful Beamless Brake, of which the following is a specification.

The device forming the subject matter of this application is a brake, adapted to be employed upon railway rolling stock of all sorts.

The invention aims to provide a brake in which the transversely extended brake beam may be dispensed with.

Another object of the invention is to provide a pair of brake carrying members movable parallel to the wheels and adapted to engage the wheels.

Another object of the invention is to provide novel means for actuating the brake carrying members.

It is within the scope of the invention to improve generally and to increase the utility of, devices of that type to which the present invention appertains.

With the foregoing and other objects in view which will appear as the description proceeds the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—Figure 1 shows the invention in top plan, the actuating mechanism being shown diagrammatically; Fig. 2 is a side elevation; Fig. 3 is a perspective showing the brake bars in perspective and separated from each other; and Fig. 4 is a perspective of one of the actuating levers.

In the drawing, the numeral 1 indicates the truck beam, and the numeral 1ª indicates the sand board. The beam 1 is provided with an outstanding bracket 2 upon which is fulcrumed intermediate its ends an actuating lever 3. A connecting rod 4 is united with the upper end of the lever 3, the connecting rod 4 being united with one end of the lever 5, the other end of which is fulcrumed as indicated at 6 upon a support 7 which may be upheld in any desired manner. A connecting rod 8 is pivoted as indicated at 9 to the intermediate portion of the lever 5, one end of the rod 8 being pivoted as indicated at 10 to a lever 11 connected as indicated at 12 to the piston rod 14 of a brake cylinder 15. To one end of the lever 11 is pivoted a connecting rod 16, permitting a simultaneous operation of two sets of the brake mechanism to be described hereinafter.

Located adjacent the ends of the sand board 1ª are supports 17 in which brake bars 18 and 19 are mounted to slide, in superposed relation, parallel to the wheel 30. A head 46 is pivotally connected with the lower end of the actuating lever 3, the head 46 being pivotally connected with the adjacent, inner ends of a pair of oppositely extended levers 20. The brake bars 18 and 19 are equipped with oppositely extended tongues 21 having openings 22. The lever 20 is fulcrumed, as shown at 23, in one of the openings 22 in one brake bar and is pivotally mounted in the diagonally disposed opening 22 in the other brake bar, as indicated at 24. The openings 22 afford, what, for convenience, may be denominated "loose connections" between the bars and the lever. The bars 18 and 19 are longitudinally slotted as indicated at 25 and pins 26 are mounted in openings 25ª in the bars, the pins 26 being adapted to move in the slots 25 to direct the relative sliding movement between the bars 18 and 19. There are several of the openings 25ª so as to permit a shifting of the pins 26, thereby to adjust and limit the bars 18 and 19 in their sliding movement. The bars 18 and 19 as shown at 27, are offset at their ends for connection with brake heads 28 carrying shoes 29 adapted to bear upon the peripheries of the wheels 30. Hangers 44 are connected with the brake heads 28, the hangers 44 being pivotally connected with the usual lugs 45 of the truck beam 1.

In operation, motion is imparted to the lever 11 from the piston rod 14, the lever 11 actuating the connecting rod 8, the latter tilting the lever 5 and the lever 5 through the medium of the connecting rod 4, tilting the actuating lever 3. The lever 3, swinging upon its fulcrum 2 will actuate the levers 20, and when the levers are tilted, the brake bars 18 and 19 will be thrust in opposite directions, the brake shoes 29 being advanced against the wheels 30. Obviously, a release of the brakes is effected by reversing the operation above described.

The members 17 serve to uphold the bars 18 and 19, should the hangers 44 break loose from the truck.

Having thus described the invention, what is claimed is:—

1. In a device of the class described, a pair of bars disposed in superposed and overlapped relation, the bars being united for right line movement; means for supporting the bars; shoes located adjacent the outer ends of the bars; a lever; and connections between the lever and the bars, one connection constituting a fulcrum for the lever, and the other connection being a pin and slot union, permitting a tilting of the lever and a right line movement between the bars.

2. In a device of the class described, a pair of alined superposed bars provided intermediate their ends with outstanding tongues; a lever fulcrumed on one tongue to one side of the bars and pivoted to the other tongue upon the opposite side of the bars, the connection between one tongue and the lever being a loose connection; interengaging elements connecting the bars for right line movement in the direction of their lengths; shoes carried by the remote ends of the bars; and supports located upon opposite sides of the tongues, the supports receiving the bars slidably.

In testimony that we claim the foregoing as our own, we have hereto affixed our signatures in the presence of two witnesses.

HARVEY L. JONES.
ROY ANDERSON.

Witnesses:
 GEO. E. BURKETT,
 CLARA ANDERSON.

---

Copies of this patent may be obtained for five cents each, by addressing the "Commissioner of Patents, Washington, D. C."